Oct. 31, 1967

H. G. ROBINSON

3,350,632

OPTICALLY PUMPED ATOMIC DIFFUSION MASER WITH SEPARATE
PUMPING AND OBSERVATION REGIONS

Filed Aug. 25, 1964

INVENTOR.
HUGH G. ROBINSON
BY
*Harry E. Aine*
ATTORNEY

INVENTOR.
HUGH G. ROBINSON
BY
ATTORNEY

INVENTOR.
HUGH G. ROBINSON
BY
ATTORNEY

United States Patent Office 3,350,632
Patented Oct. 31, 1967

3,350,632
OPTICALLY PUMPED ATOMIC DIFFUSION MASER WITH SEPARATE PUMPING AND OBSERVATION REGIONS
Hugh Gettyo Robinson, Waltham, Mass., assignor to Varian Associates, Palo Alto, Calif., a corporation of California
Filed Aug. 25, 1964, Ser. No. 391,975
18 Claims. (Cl. 324—.5)

The present invention relates in general to atomic resonance apparatus and more particularly to an optically pumped diffusion maser having separate optical pumping and observation regions. Such a maser apparatus is especially useful as a magnetometer, gradiometer, frequency standard, atomic clock, gyromagnetic resonance spectrometer, current regulator, and for other devices.

Heretofore, optically pumped atomic diffusion masers have been proposed. Such diffusion masers are characterized by a buffer gas confining mechanism for containing the radiating atoms within an observation chamber. Such a maser is proposed by James P. Wittke in the "Proceedings of the IRE," March 1957, in an article entitled, Molecular Amplification and Generation of Microwaves, pages 291 at 314 et seq. Severe difficulties have been encountered with such proposed maser devices wherein the active medium was both optically pumped and stored or confined by a buffer gas for stimulated emission of radiation within a common region or chamber. It has been found that collisions between the resonant atoms in the nonequilibrium energy state and certain metastable atoms produced by the optical pumping have severely limited the lifetime of, or excessively perturbed the phase of the radiating atoms. When the radiating lifetime of the atom is short, the Q of the electrical circuit coupled to the radiating or resonating system must be extremely high, such as for example, 60,000. Such a high Q is extremely difficult to obtain in practice.

In the present invention separate regions or chambers are provided for pumping and for observation of the atomic resonance such that while the atomic particles are undergoing stimulated emission of radiation, collision of these atoms with other atoms in the metastable state or with electrons, as produced by pumping, are greatly reduced. In this manner, the radiating lifetime of the atoms are greatly increased thereby greatly narrowing the line width of the resonance radiation. In addition to the realization of longer lifetimes for the atoms in the observation or resonance region, the possibility of perturbing the phase relation of the radiating atoms, in the observation region, is greatly reduced because such undesired collisions are largely avoided. By decreasing the resonance line width of the masing atoms and by decreasing the possibility of perturbing the phase of the radiating atoms in the observation region, the Q of the circuit coupled to the resonant atom ensemble may be drastically reduced to very practical levels such as, for example, Q's of 200 and less. Such low Q's are readily realizable in practical circuits, thus making the optically pumped diffusion atomic gas maser an extremely practical apparatus.

The principal object of the present invention is the provision of an improved diffusion type atomic gas maser apparatus.

One feature of the present invention is the provision of separate optical pumping and resonance radiation regions or chambers interconnected by a small opening which small opening determines the storage time of the polarized atoms in the resonance chamber, whereby the resonating atoms may be separated from collisions with certain metastable atoms and electrons in the pumping region to increase the radiating lifetimes of the resonant atoms.

Another feature of the present invention is the same as the preceding feature wherein the observed resonance is a nuclear Zeeman resonance of the gaseous atoms, whereby the radiating lifetime of the nuclear Zeeman resonance is extremely long and the resonance line width of the maser oscillations are extremely narrow.

Another feature is the same as the preceding feature wherein the nuclei of the resonating atoms are placed in their nonequilibrium energy state by means of a combined action of electron impact produced by an electrical discharge and resonance optical pumping radiation, whereby an extremely efficient mechanism is obtained for raising the nuclei of the radiating atoms to their nonequilibrium energy state.

Another feature of the present invention is the same as the preceding feature wherein the radiating resonance atom is $He^3$.

Another feature of the present invention is the provision of a geometrical configuration for the maser envelope having separate pumping and observation chambers wherein the observation chamber surrounds a central pumping chamber, whereby an optimum geometry is obtained.

Another feature is the provision of an electrical circuit coupled to the stimulated radiating atoms such circuit having an extremely low Q, whereby extremely wide band operation is obtained.

Another feature of the present invention is the provision of resonance atoms selected from the group consisting of $He^3$, H, $Hg^{199, 201}$, $Rb^{85, 87}$, $Cs^{133}$, $K^{39, 41}$, and $Na^{23}$.

Other features and advantages of the present invention will become apparent upon a perusal of the specification taken in connection with the accompanying drawings wherein:

Figure 1:
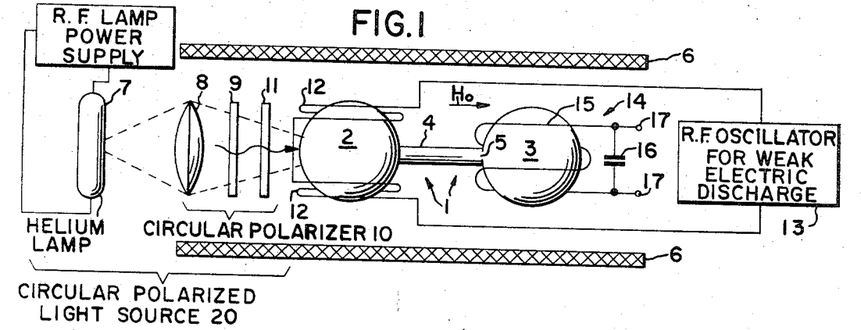
FIG. 1 is a schematic diagram of an atomic gas maser incorporating features of the present invention.

Referring now to FIG. 1, there is shown a maser apparatus of the present invention. More specifically, a dumbbell shaped container or envelope 1, as of Pyrex, serves to contain an ensemble of gaseous atoms such as, for example, $He^3$ at a suitable pressure as of approximately 1 mm. Hg. The dumbbell chamber 1 serves to provide two separate spherical chambers 2 and 3, respectively, as of, for example, 3.5 cm. in diameter connected by a small diameter diffusion tube 4, as of, for example, 4 mm. inside diameter and 3.5 cm. in length. One end of the diffusion tube 4, preferably the end connecting into the observation chamber 3, contains a small orifice 5 which determines the geometrical lifetime or, in other words, the storage time of the atoms within the observation chamber 3. The geometrical lifetime or storage time is determined by the mean time that it takes an atom which diffuses through the orifice 5 into the chamber 3 to randomly "walk" about within the chamber, suffering thousands of successive gas to gas collisions, and finally find its way back out through the orifice 5.

The dumbbell container 1 is immersed in a suitable polarizing magnetic field $H_0$, such as, for example, that produced by a solenoid 6, or in the case of a weak field a magnetometer, the earth field in which case the solenoid 6 is absent. Circularly polarized optical resonance radiation obtained from a $He^4$ lamp 7 and circular polarizer 10 is shone into the polarizing chamber 2 with the direction of propagation of the polarized light having a substantial component parallel to the direction of a strong component of the polarizing magnetic field $H_0$. The circular polarizer 10 can take any one of a number of conventional forms. In a preferred embodiment, the circular polarizer is preceded by a condensing lens 8 and includes a linear polarizer 9, such as, for example, a polaroid type HR linear polarizer for the infrared and a quarter wave plate material 11 with axes oriented at 45° to the axis of the linear polarizer. A suitable quarter wave plate material 11 is cellophane of 0.001″ in thickness.

A weak electrical discharge is excited within the polarizing bulb 2 by means of an R.F. coil 12 preferably split into two coaxial segments disposed on opposite sides of the bulb such that an alternating R.F. magnetic field is produced inside of the pumping chamber 2. The R.F. coil 12 is excited from a suitable R.F. oscillator 13 for sustaining the electric discharge.

A maser output circuit 14 is disposed around the observing chamber 3 such that the stimulated emission of radiation from the gaseous atoms is picked up in the circuit and produces a sufficient amount of interaction back on the ensemble of radiating atoms such as to obtain a coherent stimulated emission of radiation from the entire ensemble of gaseous atoms within the observing chamber 3. In one embodiment, the maser output circuit 14 includes an inductor 15 parallel resonated with a capacitor 16 at the resonant frequency of the emission of radiation. Also, the A.C. magnetic field $H_1$, produced by the radiation induced current in the inductor 15, should have a strong component $\vec{H}_1$ within the chamber 3 at right angles to the direction of the polarizing magnetic field $\vec{H}_0$.

Figures 2, 3, 4, 5:
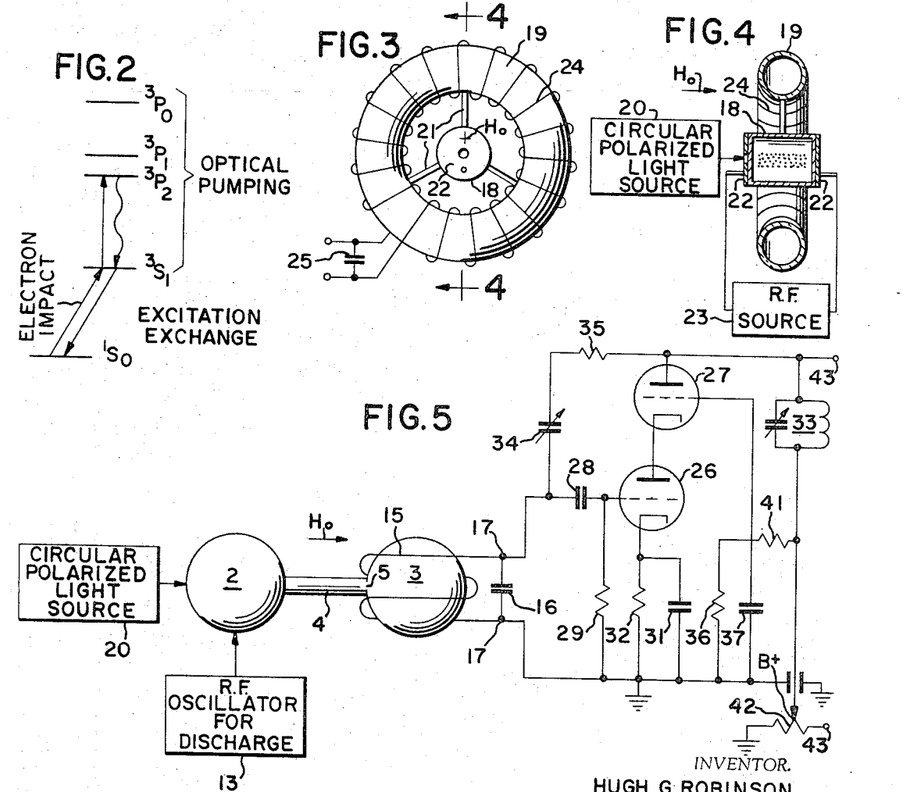
FIG. 2 is an energy diagram depicting the pumping mechanism for the nuclear polarization of the $He^3$ atom.
FIG. 3 is a top view of an alternative observation and pumping chamber configuration for the maser of the present invention.
FIG. 4 is a view of the structure of FIG. 3 taken along line 4—4 in the direction of the arrows.
FIG. 5 is a schematic circuit diagram of an atomic maser having a Q multiplying circuit.

The pumping mechanism which results in the non-equilibrium energy state of the nuclei of the helium atoms within the observing chamber 3 is as follows:

Referring to the energy level diagram of FIG. 2, $He^3(^1S_0)$ is excited by electron impact in the polarizing region or chamber 2, the electrons being produced by the weak electric discharge therein. The electron impact produces metastable $He^3(^3S_1)$ states which are optically pumped by the circular polarized $He^4$ resonance radiation. The result of the optical pumping is to create a non-equilibrium population of $^3S_1$ states for which the nuclear spins tend to be oriented in the same way. Subsequently, collisions with $He^3(^1S_0)$ states take place in which the excited electron is exchanged. The result is that the nuclear spin orientation is transferred to the $He^3(^1S_0)$ state for which the lifetime, in absence of the discharge, is very long. For example, a transverse relaxation time (radiation lifetime) for the nuclear spins of the $He^3(^1S_0)$ state of as long as 55 seconds corresponding to a resonance line with of $6 \times 10^{-3}$ c.p.s. has been obtained. This value was determined primarily by the magnetic field in inhomogeneities present.

The transfer of angular momentum from the circularly polarized light to the metastable $He^3$ and hence to the ground state of that atom results in an impressively large nuclear polarization of approximately 20 percent at a gas pressure of approximately 1 mm. Hg. The $He^3$ nuclei, thus, polarized in the presence of the magnetic field are then transported by means of the diffusion process through the small diffusion tube 4 and orifice 5 into the separate observation region or chamber 3. Use of the separate observation chamber 3 avoids the presence of metastable atoms and electrons in the resonance region. Such undesired particles in the resonance region are avoided because such electrons and metastable atoms have relatively short lifetimes. Thus, unless they are regenerated in the resonance region, as by pumping therein, they are eliminated. The observation chamber 3 is shielded from the pumping light and electric discharge.

On the otherhand, the polarized nuclei when not perturbed by such metastable atoms and electrons have lifetimes greatly in excess of one second and can be stored for relatively long periods in the radiating state within the observation chamber 3.

For example, in the above $He^3$ maser apparatus described with regard to FIG. 1 and utilizing the dimensions called for therein, the orifice 5 was dimensioned of such a small diameter as of 0.1 mm., such that the storage lifetime at the particular pressure was on the order of 28 seconds and the Q of the tuned output circuit 14 was approximately 200. With these parameters maser oscillation of a power of $5 \times 10^{-14}$ watts was obtained at terminals 17 width a resonance line with of $1.6 \times 10^{-2}$ c.p.s. in a polarizing field $H_0$ of 32 gauss.

With the above parameters, described with regard to FIG. 1, and that of a field of 32 gauss, the nuclear resonance frequency of the maser oscillations in chamber 3 were at 103 kc./second. The above power and line width give a fractional RMS frequency fluctuation $(\Delta\nu^2)^{1/2}/\nu_0$ which is approximately $5 \times 10^{-12}/\nu t$ for an observation time of $t$ seconds. This stability results from fundamental phase fluctuations caused by thermal energy in the tank circuit and neglects contributions due to magnetic field fluctuations. An order of magnitude decrease in the resonance line width is easily obtained to approximately $6 \times 10^{-3}$ c.p.s. with transverse relaxation times of as long as 55 seconds utilizing apparatus substantially the same as that shown in FIG. 1.

$He^3$ has the unusual property of being able to undergo many wall collisions with the containing vessel 3 without appreciable perturbation of its radiating nuclear quantum state. Furthermore, there is significant motional narrowing of the resonance line because of the relatively fast diffusion of helium through the magnetic field. This motional narrowing secures a narrow line width and also produces a symmetrical line shape, even when the magnetic field inhomogeneity distribution across the sample within chamber 3 is asymmetric. Hence, the output frequency of the $He^3$ maser is uniquely related to the average magnetic field over the sample and the value of the (shielded) He³ nuclear magnetic moment.

Other atomic species may be utilized for providing the active atomic material for an optically pumped diffusion maser. More specifically, such other materials include $Hg^{199, 201}$, $Rb^{85, 87}$ and other alkalies. Hydrogen is also a useful material for producing optically pumped diffusion masers. Masers using such other materials are more fully described below. It must be realized that in order to obtain long storage times and long active lifetimes of the radiating atoms that a significant number of wall bounces will be obtained in the observation chamber 3 even though the predominant confining mechanism therein is one of buffer gas collisions. Thus, the atom utilized for the active material of the maser must possess qualities which permit it to suffer numerous wall bounces without undue perturbation of the stimulated emission of radiation and without recombining with the walls or otherwise relaxing. In this regard $Hg^{199, 201}$ will bounce extremely well while the alkalies as well as hydrogen require non-relaxing inert wall coatings such as Teflon or paraffin. In the case of the He³ atom the stimulated emission of radiation comes from the nuclear resonance of the helium atom. However, in certain others of the above atoms the atomic resonance comes from either the hyperfine or Zeeman resonance of the valence electron.

In the case where hyperfine resonance is utilized for a maser transition, such as for the alkalies which includes rubidium, resonance is obtained from the electron magnetic moment of the atom which is approximately 1000 times greater in magnitude than the magnetic moment of the nuclei of the atom. Thus, for a hyperfine maser a substantially fewer number of atoms, within the observation chamber, will provide a stimulated emission of radiation signal of the same order of magnitude as that produced by nuclear resonance. Thus, one will expect that in the case of the alkalies and hydrogen, using hyperfine transitions, the gas pressures within the polarizing and observation chambers will be substantially less than the pressure utilized for helium. Nevertheless, it is contemplated that the predominant confining storage mechanism will still be one of a buffer gas rather than characterized by a bounce box storage mechanism wherein the stored atom makes successive collisions with the walls of the container with much less probability of collision with other gaseous atoms within the storage chamber, i.e., the mean free path of the atoms is greater than the transverse dimensions of the confining chamber.

It should be understood that although FIG. 1 discloses only one pumping chamber 2 and associated light source, lens and polarizers 7, 8, 9 and 11, one or more additional similar pumping chambers and associated light sources could be coupled by associated diffusion tubes to the observation chamber 3, if desired. This procedure would enhance polarization and result in greater output power. Similar considerations apply to the subsequent embodiments.

Referring now to FIGS. 3 and 4 there is shown an alternative geometrical construction for the maser apparatus of the present invention useful for improved operation in weak fields such as the earth's field. More specifically, an improved filling factor is obtained by utilizing a cylindrical pumping chamber 18 as of Pyrex surrounded by a toroidal observation chamber 19. The toroidal chamber is interconnected to the central pumping chamber 18 via the intermediary of a plurality of spoke-like diffusion tubes 21 having orifices 5 therein as previously described with regard to FIG. 1 for determining the geometrical lifetime of the radiating atoms within the storage and observation chamber 19. As in the previous example a pair of electrodes 22 are disposed at opposite ends of the cylindrical pumping chamber and are excited by R.F. energy derived from an R.F. source 23 to provide a weak electric glow discharge within the pumping chamber. One of the electrodes is apertured to admit circularly polarized resonance radiation from source 20 for pumping the atoms within the pumping chamber to higher energy states. As in the previous example the direction of propagation of the circularly polarized optical radiation is parallel to the direction of the magnetic field. Around the toroidal observation chamber 19 there is wound an inductor 24 which may be parallel resonated with capacitor 25 to form the output circuit 14 of the maser apparatus.

Referring now to FIG. 5 there is shown an alternative improved maser apparatus of the present invention wherein the output circuit 14 includes a Q multiplying circuit for enhancing reception of maser oscillations within the observation chamber 3.

Briefly, the Q multiplying circuit includes a pair of vacuum tubes 26 and 27, respectively, series connected to each other such that the plate of the first tube 26 is coupled directly to the cathode of the second tube 27. The output oscillations of the maser circuit 14 are coupled via a coupling capacitor 28 and grid bias resistor 29 to the grid of the first tube 26 wherein the maser oscillation signals are amplified and appear in the plate circuit of the first tube 26. A parallel connection of capacitor 31 and resistor 32 is provided in series with the cathode lead of the first tube 26 to provide a cathode to grid self-bias for stabilizing the operating point of the amplifier 26.

The amplified signals of the first tube 26 are applied to the second tube 27 via the cathode circuit and are amplified therein. The amplified signals appear across the tuned tank circuit 33 of the second amplifier tube 27. The tank 33 is slightly detuned from the expected atomic resonance to provide 90° phase shift at the maser frequency. A portion of the amplified and phase shifted output signal from the second tube 27 is coupled back to the input of the first tube 26 via the intermediary of a 90° phase shift network consisting of a coupling capacitor 34 and series resistance 35. This combined phase shift of the feedback path and detuned tank 33 provides a slight positive feedback, just below the level of self-oscillation, such that with a slight maser signal maser oscillation is obtained. An RC self-biased network is coupled between ground and the grid of the second tube 27 to provide stable operation. The self-biased network includes a parallel network of resistance 36 and capacitance 37 series connected with the grid to ground lead of the amplifier tube 27. Fixed grid bias is obtained via a bias resistor 41 from the B+ supply 42.

Tubes 26 and 27 together with their associated electrical network serve to multiply the Q of the maser output circuit 14. The output maser oscillations then appear at output terminals 43. The advantage of using the Q multiplying circuit as shown in FIG. 5 is that it will permit maser oscillations to be observed of atomic gas resonance when the maser conditions are marginal in the absence of the Q multiplying circuit.

Figure 6:
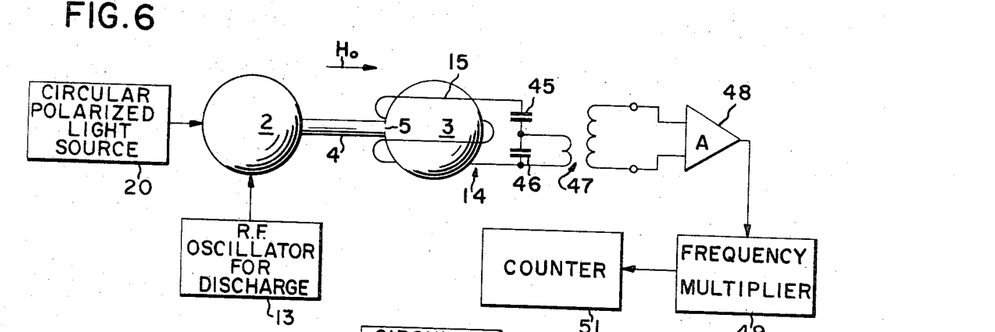
FIG. 6 is the output circuit diagram for an atomic maser of the present invention as utilized for a magnetometer.

Referring now to FIG. 6, there is shown a typical magnetometer apparatus utilizing maser features of the present invention. More specifically, the output circuit of the maser includes the inductor 15 parallel resonated with series capacitors 45 and 46, respectively. Capacitors 45 and 46 serve as a voltage divider network for impedance matching into a suitable step up transformer 47. The high voltage secondary of the step up transformer 47 is coupled into the input of an amplifier 48 for amplifying the maser oscillations at the resonant frequency thereof. In the case of nuclear resonance, the maser oscillations typically will be of a relatively low frequency. The frequency depends upon the magnitude of the magnetic field $H_0$ being measured. In the earth's magnetic field the maser oscillation will be at approximately 2 kc. corresponding to an earth's field magnitude of approximately 0.5 gauss. On the other hand if an electron spin system is utilized as the active medium, such as for example, that found in hydrogen or rubidium, the resonance is a hyperfine resonance or an electron resonance and the resonant frequency will be in the order of 1400 mc./sec. for hydrogen and 6800 mc./sec. for rubidium.

In the case where the low frequency resonance is utilized, such as that obtained by resonance of the nuclei of $He^3$, it is preferred that a frequency multiplier 49 be coupled to the output of the amplifier 48 for multiplying the resonance signal to one of a higher frequency which will yield the desired degree of precision when measured by a suitable counter 51. The counter displays and may record the frequency as derived from the output of the frequency multiplier 49. By knowing the multiplying factor of the multiplier 49 the resonance frequency of the nuclei is readily ascertained and this resonance frequency is a direct measure of the magnetic field intensity $H_0$. If desired, the counter can be specially adapted such that the read-out is directly in terms of magnetic field intensity.

The extreme spectral purity of the resonance signal obtainable from the maser of FIG. 6 permits unprecedented measurement or control of a magnetic field. Also, the maser output frequency will follow faithfully almost instantaneously changes in field. This is true in spite of the high Q of the nuclear Zeeman transistion. While FIG. 6 shows the maser as having the dumbbell shaped container geometry, if the magnetometer is to be utilized for measuring weak fields, such as for example, the earth's field, it is preferred that the geometry of FIG. 3 be utilized since in that case the filling factor for the magnetometer will be enhanced, as previously described.

Figures 7, 8:
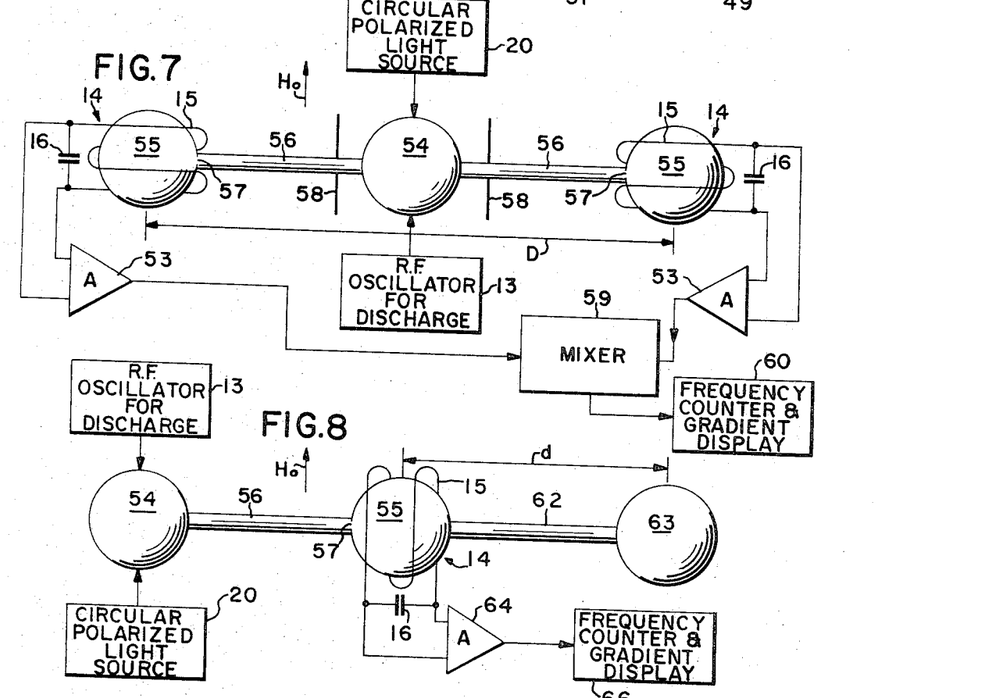
FIG. 7 is a schematic diagram of a gradiometer utilizing features of the present invention.
FIG. 8 is an alternative gradiometer apparatus employing features of the present invention.

Referring now to FIG. 7, there is shown a gradiometer apparatus incorporating features of the present invention. More specifically, a common pumping chamber 54 contains the active gaseous atoms therein. The pumping chamber is connected to a pair of observation chambers 55 spaced some distance from the pumping chamber 54 and separated from each other by distance D which can be on the order of meters in length. The observation chambers 55 are interconnected to the pumping chamber 54 via the intermediary of elongated diffusion tubes 56 containing orifices 57 for determining the geometrical lifetime of the radiating atoms within the observation chambers 55. As in the previous examples, the device is filled with a suitable gas such as $He^3$ and the pumping chamber 54 is irradiated with circularly polarized light from a suitable source 20, the direction of the light being parallel to the direction of the magnetic field it is desired to measure. In addition, the pumping chamber contains a weak electrical discharge such that the $He^3$ nuclei are polarized as described above with regard to FIG. 1.

A pair of R.F. or electromagnetic shields 58, as of copper, are disposed between the pumping chamber 54 and the observation chambers 55 to prevent interference between the maser oscillations in the spaced observation chambers 55. Maser circuits 14, coupled to the spaced observation chambers 55, provide output signals having frequencies corresponding to the magnetic field intensities over the respective observation chambers. If there is a gradient in the magnetic field, then the maser oscillation frequency from one chamber 55 is slightly different than the maser oscillation frequency from the other observation chamber and the difference in frequency is a direct measure of the magnetic field gradient. The two maser signals can be readily compared in a suitable frequency mixer or lock-in detector to yield a direct output signal which is a measure of the gradient.

The maser output signals from the two observation chambers 55 are preferably first each supplied to separate pre-amplifiers 53 to prevent coupling and pulling of one maser oscillator by the other. The outputs of the pre-amplifiers 53 are then fed to a mixer 59 where they are mixed to produce a difference frequency which is fed to a frequency counter and suitable gradient display device 60 giving a direct indication of the gradient. If desired, greater precision may be obtained by multiplying the output of the mixer 59 before counting and displaying in frequency counter and display 60 in order to obtain greater precision in the measurement of the difference frequency, as previously described.

The particular geometry shown in FIG. 7 is especially desirable since it permits the two observation regions to be fed from a single pumping chamber.

Referring now to FIG. 8, there is shown an alternative maser apparatus of the present invention. This apparatus is similar to that shown in FIG. 7 with the exception that it is simplified to the extent that only a single maser circuit is utilized together with a single preamplifier. In this case, atomic particles pumped in the pumping chamber 54, as previously described in FIG. 7, diffused through a first diffusion tube 56 into a first observation chamber 55 via orifice 57. A certain fraction of the atomic gas particles within observation chamber 55 are permitted to escape from chamber 55 and diffuse along a second diffusion tube 62 to a second observation chamber 63. Diffusion tube 62 communicating between the pumping chamber 55 and the second observation chamber 63 is dimensioned such that the diffusion time through the tube 62 is relatively short compared to the radiation time of the atomic particles. In this manner, the resonant frequency of the particles in the first observation chamber 55 is determinative of the average magnetic field intensity in the chambers 55 and 63. Thus, the average magnetic field in chamber 63 can effectively be monitored by the output maser circuit 14 without the necessity of using an output circuit directly at chamber 63. Thus, the maser resonance signal is detected in the output maser circuit 14 which is then amplified in the amplifier 64 and fed to the counter and indicator 66 as previously described.

Figure 9:
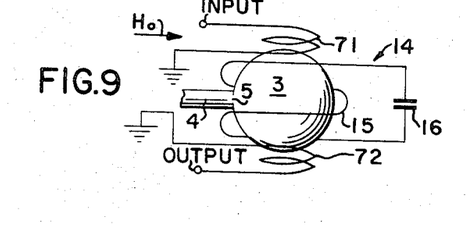
FIG. 9 is a schematic circuit diagram showing the output circuit portion of a narrow band tunable filter or tunable amplifier incorporating features of the present invention.

Referring now to FIG. 9, there is shown a narrow band tunable filter or tunable amplifier embodiment of the present invention. More specifically, there is shown the maser apparatus according to FIG. 1 wherein the output circuit 14 has been slightly modified by including a separate input loop 71 coupled to the observation chamber. Also coupled to the observation chamber is an output loop 72 wherein output signals are obtained. When the apparatus is operated as a narrow band, tunable filter or amplifier, the maser parameters of filling factor $\eta$, Q of the tuned output circuit, and polarization $M_0$ of the atomic resonance particles are one or more reduced below the threshold level of sustained maser oscillation. In such a case, the particles within the observation chamber are not undergoing coherent stimulated emission of radiation such that there is no output signal. However, in the presence of an input signal applied to observation chamber and the maser tank circuit via the intermediary of the input loop 71, the input signal if at the resonant frequency of the atoms within the observation chamber, will produce a stimulation of emission or radiation from the ensemble of atoms, such emission being coherent and serving to amplify the signal applied via the input loop 71. The stimulated emission of radiation is then received in the maser tank circuit and coupled outwardly thereof by output loop 72 to a useful load not shown.

The pass band of the device as a filter or amplifier is tuned by varying the magnitude of the polarizing magnetic field $H_0$ by changing the current in the solenoid 6 or by providing a suitable secondary bucking coil for altering the total polarizing field over the observation chamber. As a narrow band filter or amplifier the device has extremely narrow band width characteristic of the Zeeman resonance line width on the order of $10^{-3}$ cycles per second. As previously stated the center frequency is set by the polarizing magnetic field intensity and tuning of this field intensity varies the center frequency of the filter and/or amplifier. The device is capable of following extremely rapid fluctuations in the field and hence a time programmed center frequency is obtainable which may be used for secure communications or the like. The frequency response is Lorentzian. The pass band of the tunable filter or amplifier can be altered by dimensioning the observation chamber orifice 5 to adjust the geometric lifetime of the radiating atoms. For example, decreasing the geometric lifetime within the observation chamber increases the pass band of the maser. In addition, the pass band can be increased by increasing the magnetic field inhomogeneity over the observation chamber or by increasing the temperature of the observation chamber.

The electronic tunable band width of the maser oscillator or amplifier can be greatly increased by provision of an output circuit 14 which has a Q on the order of one or less. However, as the Q of the output circuit is decreased, the filling factor $\eta$ and/or magnetic polarization $M_0$ of the resonance ensemble of atoms must be increased to maintain maser conditions. The filling factor can be optimized, as previously demonstrated, by using a toroidal observing chamber geometry. The magnetization $M_0$ of the radiating atoms can also be increased by several means, such as: increasing the pumping light flux, increasing the pressure of the active gaseous atoms while maintaining a given polarization, or by lowering the temperature of the observation chamber relative to the temperature of the pumping chamber. This latter temperature effect permits an increase in the density of the radiating atoms by the ratio of the absolute temperatures of the two chambers. For example, cooling the observation chamber to 77° Kelvin from 300° Kelvin reduces the Q required for oscillation by a factor of approximately 4. The power output is increased by approximately a factor of 16.

If found desirable or necessary to eliminate any possibility of direct coupling between the input circuit 71 and output circuit 72, these circuits could be physically oriented, for example, in quadrature, for decoupling purposes or other shielding means could be employed as would be obvious to those skilled in the art.

Figure 10:
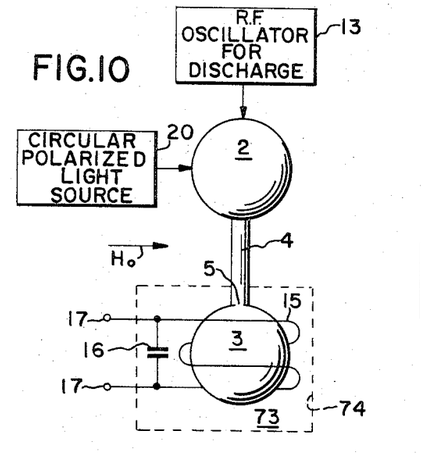
FIG. 10 is a schematic diagram of an alternative maser apparatus utilizing a refrigerated observation chamber.

Referring now to FIG. 10, there is shown a maser oscillator apparatus employing features of the present invention wherein the observation chamber 3 is cooled by liquid nitrogen or other refrigerant 73 contained within a suitable Dewar 74 to a low temperature such that the output circuit can have its Q reduced while maintaining maser oscillation. In such a device, the Q can easily be reduced to a Q on the order of one or less yielding a device which is operable over a wide band of frequencies. The resonance line width is still very narrow but the resonance conditions are not so critically dependent upon tuning of the output circuit. Thus, by varying the intensity of the polarizing magnetic field the device is operable over an extremely wide dynamic range of magnetic field intensities and maser frequencies without corresponding tuning of the output circuit.

Figure 11:
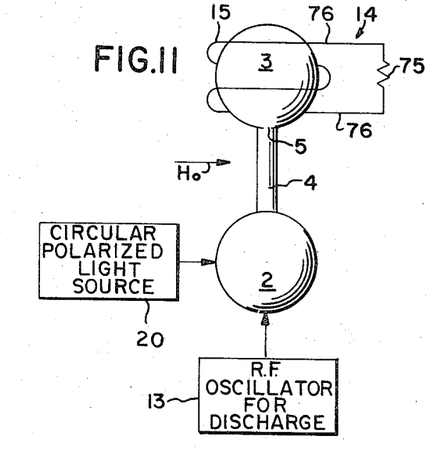
FIG. 11 is a schematic circuit diagram of a low Q output circuit for the masers of the present invention.

Referring now to FIG. 11, there is shown an alternative low Q output circuit for a maser oscillator and/or amplifier utilizing features of the present invention. More specifically, the output circuit includes an inductor 15 for receiving the emission of radiation and the inductor is coupled directly to a suitable load 75 via leads 76. In this case, the inductive reactance of inductor 15 is preferably less than the load resistance at the maser frequency.

Figures 12, 13, 14:
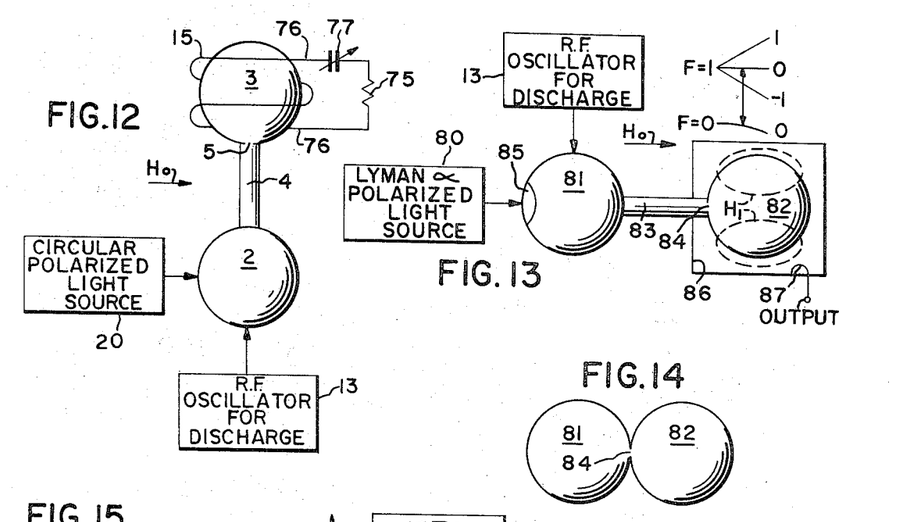
FIG. 12 is an alternative low Q output maser circuit of the present invention.
FIG. 13 is a schematic diagram of an atomic hyperfine maser incorporating features of the present invention.
FIG. 14 is a schematic diagram of an alternative two chamber maser apparatus.

Referring now to FIG. 12, there is shown an alternative embodiment to the structure of FIG. 11 wherein the inductor 15 is coupled to the load 75 via the intermediary of a series variable capacitor 77 and leads 76. Here again, the Q of the output circuit can be on the order of one or less and again it is preferred that the inductive reactance of the output circuit at the maser frequency be less than the resistance of the load 75. The variable capacitor 77 is provided for tuning out the inductive reactance of the coil 15. In these output circuits Q is defined by the ratio of $\omega L/R$.

Referring now to FIG. 13, there is shown an atomic hydrogen diffusion maser utilizing the separate pumping and observation chamber feature of the present invention. More specifically, the maser includes a pumping chamber 81 containing hydrogen gas at a low pressure. The pumping chamber is connected to an observation chamber 82 via the intermediary of a diffusion tube 83 and orifice 84 for determining the geometrical lifetime of the particles within the observation chamber 82, as previously described. The dumbbell shaped gas containing structure is formed of a suitable material, such as, for example, quartz and preferably lined on the entire interior thereof with an inert material which will not cause excited hydrogen atoms to relax or recombine. Such a material includes Teflon or paraffin. The dumbbell shaped structure is then immersed in a very small polarizing magnetic field $H_0$ as of 100 $\mu$gauss and shielded from extraneous magnetic fields in the conventional manner, not shown.

In the apparatus of FIG. 13, the device is designed to operate on a field independent hyperfine transition of $\Delta M=0$, $\Delta F=1$, as indicated in the energy diagram associated with FIG. 13. In such a case, pumping light is shone into the pumping chamber 81 from a polarized light source 80 by means of a suitable window 85 such as LiF formed in the side wall of the pumping chamber 81. The pumping light is preferably Lyman alpha radiation which is $\sigma$ or $\pi$ polarized by conventional polarizing techniques. As before, a suitable means is provided for sustaining a weak electrical glow discharge within the pumping chamber 81 for production of atomic hydrogen atoms.

The observation chamber 82 is surrounded by a suitable cavity resonator 86, such as a cylindrical resonator dimensioned for operation in the dominant $TE_{0,1,1}$ mode at the atomic hydrogen hyperfine resonant frequency, which is approximately 1420 mc. A suitable coupling loop 87, turned 90° for clarity in the figure is coupled to the magnetic fields of the circular electric mode resonator 86 for coupling maser oscillation signals from the cavity 86 to a suitable amplifier and load, not shown. The circular electric mode cavity 86 is arranged with regard to the direction of polarizing magnetic field $H_0$, such that the alternating magnetic field component $H_1$ of the oscillating $TE_{0,1,1}$ mode is parallel to the direction of the polarizing magnetic field $H_0$, and is also relatively uniform across the observation chamber 82. As before, the pumping light is applied to the pumping chamber 81 in a direction which is parallel to the direction of the polarizing magnetic field $H_0$.

The atomic hydrogen diffusion maser of FIG. 13 utilizes a field independent hyperfine transition such that the resonance maser oscillation obtained from the output loop 87 may be utilized as a frequency standard or atomic clock signal in the conventional manner.

The presence of $H_2$ gas within the pumping and observation chambers 81 and 82, respectively, will not prevent operation of the hydrogen maser since the hydrogen gas operates as an excellent buffer gas for the atomic hydrogen atom. In a preferred embodiment, the operating pressure within the dumbbell shaped maser container structure is as low as possible since with the lowest operable pressure the best magnetic field inhomogeneity averaging is obtained due to the higher diffusion velocity of the atomic hydrogen particles. In addition, a much lower pressure of atomic hydrogen and hydrogen gas is permissible in relation to the $He^3$ gas pressure used for the $He^3$ maser, previously described, since the magnetic moment of the electron of the hyperfine transition of atomic hydrogen is approximately 1000 times greater than the magnetic moment of the nucleus of the $He^3$ atom.

Referring now to FIG. 14, there is shown an alternative to the maser container structure of the present invention. In this structure, the length of the diffusion tube 83 has been reduced to zero such that the observation and polarizing chambers are substantially adjacent each other and separated only by means of the orifice 84. This has the advantage of added strength and smaller volume of space occupied by the maser.

Figure 15:
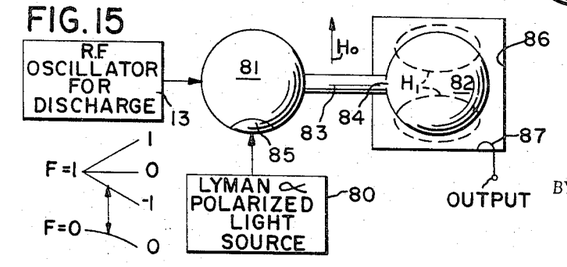
FIG. 15 is a schematic diagram of an alternative hyperfine maser apparatus.

Referring now to FIG. 15, there is shown an alternative hydrogen diffusion maser utilizing features of the present invention. This maser includes the same apparatus as the structure of FIG. 13 and identical numbers have been used to describe similar parts. Note, however, that this maser is designed for operation on a field dependent hyperfine transition of $\Delta M=1$, $\Delta F=1$. In such a case, it will be noted that the pumping light is still applied in a direction parallel to the polarizing magnetic field $H_0$, but in the observation chamber the alternating magnetic field $H_1$ of the resonant mode of the resonator is arranged to be perpendicular to the direction of the polarizing magnetic field $H_0$. By using the field dependent hyperfine transition the maser of FIG. 15 is useful as a magnetometer or magnetic field measuring or sensing device.

Figure 16:
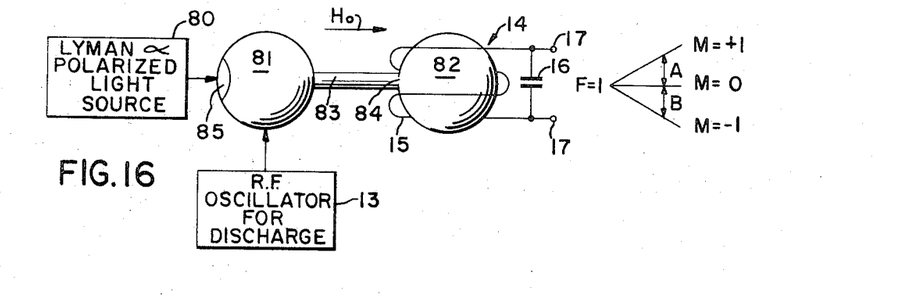
FIG. 16 is a schematic diagram of an alternative Zeeman transition maser.

Referring now to FIG. 16, there is shown an alternative hydrogen diffusion maser wherein the structure is substantially identical to that shown in FIG. 1 and the maser is designed for operation of an electron Zeeman transition of atomic hydrogen. More specifically, the $\Delta M=1$, $\Delta F=0$ transition is utilized. The energy diagram is shown and the output resonant frequency of the output circuit 14 is tuned for resonance at either one of the Zeeman frequency transitions A or B. These transitions are magnetic field intensity dependent and thus the apparatus is useful as a magnetometer or magnetic field intensity sensing device.

Figure 17:
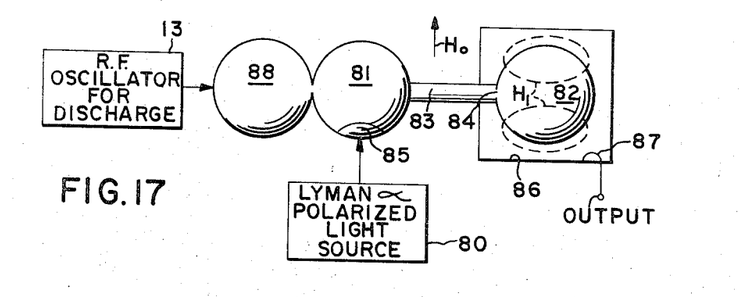
FIG. 17 is a schematic diagram of an alternative maser structure incorporating separate electric discharge, polarizing and observation chambers.

Referring now to FIG. 17, there is shown an alternative hydrogen maser apparatus incorporating features of the present invention. In the structure of FIG. 17 the apparatus is substantially identical to that shown in FIGS. 13 and 15 with the exception that a third chamber 88 is provided in communication with the pumping chamber for supporting the weak electrical discharge therein. In this manner, the separate discharge chamber 88 may be provided with uncoated walls such that the wall coating material will not interfere with proper operation of the electrical discharge which produces the atomic hydrogen.

Figure 18:
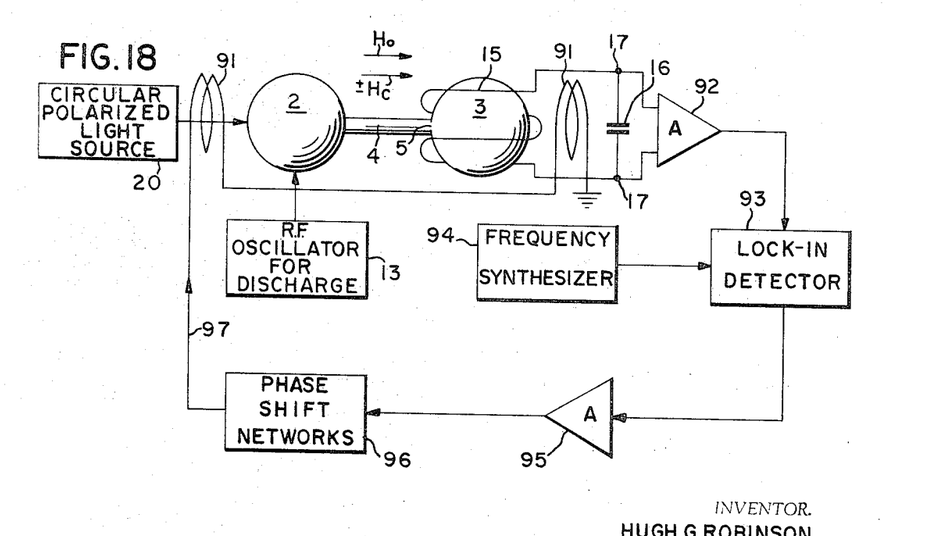
FIG. 18 is a circuit diagram in schematic block diagram form of a magnetic field stabilizing apparatus incorporating features of the present invention.

Referring now to FIG. 18, there is shown a magnetic field stabilizer utilizing a maser incorporating feature of the present invention. More specifically, a magnetic field dependent maser such as that shown in FIG. 1 is disposed within a magnetic field $H_0$, which it is desired to stabilize. The magnetic field dependent maser output frequency is fed to amplifier 92 wherein it is amplified and fed to one terminal of a lock-in detector 93. A frequency synthesizer or reference oscillator 94 serves to provide a reference frequency determinative of the magnetic field intensity to which it is desired to stabilize the magnetic field $H_0$. The output of the frequency synthesizer 94 is fed to the other input terminal of the lock-in detector 93 where it is compared to the maser frequency to obtain a D.C. error output signal of a phase and magnitude corresponding to the departure of the magnetic field from the desired reference magnitude as determined by the frequency of the frequency synthesizer. The D.C. error signal is then fed to an amplifier 95 wherein it is amplified and thence fed via a phase shifter 96 back via lead 97 to a field corrective coil 91 which superimposes its field $H_c$ upon the field $H_0$ to be stabilized. The phase shifter 96 is adjusted to prevent self-oscillation of the closed loop system.

The main field $H_0$, which it is desired to control, is programmable by tuning the frequency synthesizer 94 to the desired frequency. Again, the maser output frequency faithfully follows rapid changes in the magnetic field intensity in which it is immersed. The band pass limitations of the system are set by the pass band characteristics of the closed loop serve system. In certain instances, it may be desirable to have one or more additional parallel feed back paths including amplifiers 95 and phase shifters 96 and lower inductance corrective coils 91 having wider band pass characteristics to reduce field fluctuations to an acceptable level so that the final high pass, narrow band loop can maintain lock.

Figure 19:
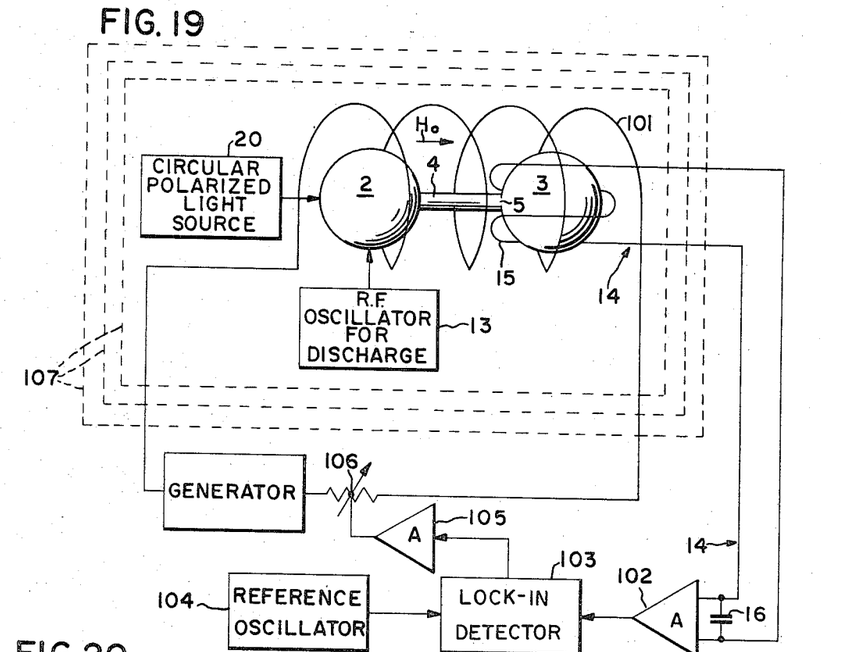
FIG. 19 is a schematic diagram of a current regulator apparatus incorporating features of the present invention.

Referring now to FIG. 19, there is shown a current regulator apparatus utilizing features of the present invention. More specifically, an atomic gas diffusion maser having separate pumping and observation regions such as shown in FIG. 1 is disposed within the magnetic field produced by a solenoid 101 formed of a conductor, the current in which it is desired to regulate. A given current through the solenoid 101 will produce a given magnetic field intensity $H_0$, which results in a certain maser oscillation frequency. The maser signals are coupled from the maser into amplifier 102 wherein the signals are amplified and thence fed to one input terminal of a lock-in detector 103. As in the case of the magnetic field stabilizer or regulator of FIG. 18, a reference oscillator or frequency synthesizer 104 produces a reference frequency corresponding to a given desired magnitude of current through the circuit to be regulated which includes the inductor 101 as a part thereof.

The reference frequency signal derived from reference oscillator 104 is fed to the other input terminal of the lock-in detector 103 wherein it is compared with the maser oscillation frequency to produce a D.C. output error signal. The error signal is then fed to the input terminal of amplifier 105 wherein it is amplified and fed to the control terminal of a suitable current control regulator device 106 connected in series with the current through which the current is to be regulated. A suitable current regulating device would include a power transistor or a vacuum tube.

The regulator 106 serves to increase or decrease the current in the circuit being regulated in order to bring this current into coincidence with a magnitude of current determined by the reference frequency of the reference oscillator 104. A plurality of magnetic permeable shields 107 enclose the coil 101 and maser to prevent external magnetic field influences from disturbing the desired current regulation. Suitable magnetic shield materials include soft iron and permalloy.

Figure 20:
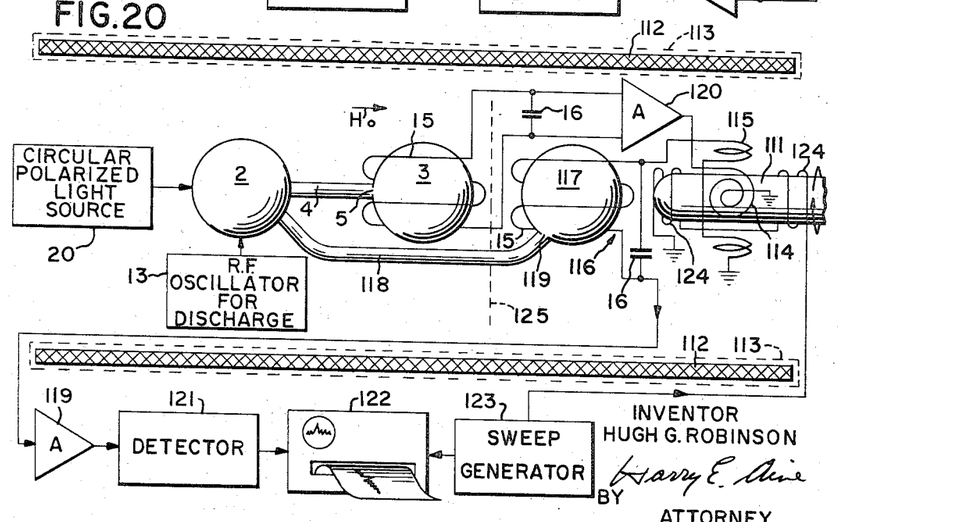
FIG. 20 is a schematic line diagram of a gyromagnetic resonance spectrometer utilizing features of the present invention.

Referring now to FIG. 20, there is shown a gyromagnetic resonance spectrometer apparatus utilizing features of the present invention. More specifically, a sample of matter which it is desired to investigate is disposed within a sample vial 111 and immersed within a polarizing magnetic field $H_0$, such as produced by a superconducting solenoid 112. A suitable Dewar arrangement is provided at 113 for cooling the superconducting solenoid 112 to its superconducting temperature such as, for example, liquid helium temperature. A transmitter coil 114 is disposed adjacent the sample vial 111 for applying an alternating magnetic field component to the sample at right angles to the polarizing magnetic field $H_0$. The transmitter signal is derived via amplifier 120 from the output circuit of a suitable maser, such as, for example, a helium maser as described with regard to FIG. 1 where like numerals have been utilized to identify similar apparatus.

A receiver coil 115 is disposed with its axis at 90° to the transmitter coil to prevent coupling from the transmitter directly into the receiver coil. Also, the receiver coil 115 is disposed with its axis at right angles to the polarizing magnetic field $H_0$. When the transmitter frequency is at the resonant frequency of the gyromagnetic bodies within the sample of material under analysis gyromagnetic resonance is excited in the sample and their precession about the polarizing magnetic field $H_0$ will induce a signal in the receiver coil 115. The resonant signal picked up in the receiver coil 115 is fed to a maser amplifier circuit 116, preferably of the low Q type, as previously described with regard to FIGS. 9, 11 and 12. The resonance signals received in receiver coil 115 are amplified in the maser amplifier over a wide range of frequencies without special turning of the maser amplifier circuit 116. The maser amplifier circuit 116 is coupled to an observation chamber 117 as previously described with regard to the amplifier embodiment of FIG. 9. The maser amplifier observation chamber 117 is coupled to the common pumping chamber 2 via the intermediary of a diffusion tube 118 and orifice 119.

The resonance signals as amplified by the maser amplifier circuit 116 are coupled to the input terminals of a second amplifier 119 wherein they are amplified and then detected in detector 121 and thence fed to one terminal of a suitable display device such as oscilloscope and recorder 122 wherein they are displayed as a function of a sweep signal obtained from sweep generator 123. The sweep generator also serves to provide a sweep signal to a pair of sweep coils 124 serving to sweep the polarizing magnetic field intensity over the sample of matter under investigation within the vial 111. An electromagnetic shield 125 as of copper is disposed between the two observation chambers 117 and 3 of the maser amplifier and oscillator, respectively, to prevent direct electromagnetic coupling therebetween.

The advantage of utilizing the maser oscillator-amplifier in combination with the gyromagnetic sample of matter under investigation is that an extremely precise and self-stabilizing spectrometer apparatus is obtained. More specifically, the transmitter signal has an extremely narrow line width of on the order of $6 \times 10^{-3}$ c.p.s. and likewise the maser amplifier circuit has a line width of the same order such that the maximum signal-to-noise ratio is obtained. In addition, by disposing the maser oscillator amplifier and sample under investigation in the same polarizing magnetic field $H_0$, the transmitter and receiver circuits react with the instantaneous minute fluctuations of the polarizing magnetic field in such a way as to compensate for the fluctuations in the polarizing magnetic field and maintain a precise, stable output resonance signal.

Since many changes could be made in the above construction of this invention and many apparently widely different embodiment of this invention could be made without departing from the scope thereof, it is intended that all matter contained in the above description or shown in the accompanying drawings shall be interpreted as illustrative and not in a limiting sense.

What is claimed is:

1. An atomic resonance apparatus for obtaining regenerative stimulated emission of atomic resonance radiation including, an envelope structure for containing a gaseous atomic medium therein at pressures wherein the predominant gas confining mechanism is one of successive gas to gas collisions, means for constricting diffusion of gaseous atoms from a first region of said envelope structure to a second region of said envelope structure, means for applying optical pumping radiation to said gaseous medium in a first one of said regions for producing certain nonequilibrium energy states of said gaseous atoms, electrical circuit means having the magnetic fields thereof coupled into said second region for electromagnetic interaction with an ensemble of the nonaquilibrium energy gaseous atoms that have diffused from said first region into said second region, and the coupling between said electrical circuit means and said ensemble of gaseous atoms in said second region being sufficiently great such as to produce a net flow of coherent power at the atomic resonance frequency of said ensemble from said ensemble of gaseous atoms in said second region to said electrical circuit means, whereby said radiating ensemble of atoms is removed from the deleterious effects of pumping products produced in said first region and whereby said circuit means operates independently of the applied optical pumping radiation, applied in said first region, to monitor atomic resonance of said ensemble of gaseous atoms in said second region.

2. The apparatus according to claim 1 including means for introducing into said first pumping region atoms excited by an electrical discharge for interaction with said optical pumping radiation.

3. The apparatus according to claim 1 wherein stimulated emission of radiation is obtained from the nuclei of the atoms in said second region.

4. The apparatus according to claim 2 wherein said gaseous atoms are $He^3$ and the radiation in said second region is obtained from the nuclei of the atoms making up said ensemble of atoms in said second region.

5. The apparatus according to claim 1 wherein said envelope structure is formed with said second region of the envelope surrounding said pumping region whereby a more efficient maser geometry is obtained.

6. The apparatus according to claim 1 wherein said electrical circuit coupled to said ensemble of radiating atoms has a Q of less than 10, whereby a wide band operation is obtained.

7. The apparatus according to claim 1 wherein said resonance atoms are selected from the group consisting of $He^3$, hydrogen, $Hg^{199, 201}$, and $Rb^{85, 87}$.

8. The apparatus according to claim 1 wherein said electrical circuit is a cavity resonator.

9. An optically pumped atomic diffusion maser apparatus including, means forming an envelope structure, means forming an assemblage of gaseous atoms filling said envelope means to a pressure such that the mean free path of the atomic particles within said envelope means is substantially less than the characteristic transverse dimensions of said envelope means whereby said atomic particles travel by diffusion within said envelope, means within said envelope for constricting the diffusion of atomic particles from one region of said envelope to a second region of said envelope, means for producing an electrical discharge in the atomic particles in said first region thereby placing said atoms in a nonequilibrium energy state by means of electron impact, means for irradiating said nonequilibrium energy state atoms produced by said electrical discharge with resonance optical pumping radiation to produce an overpopulation and polarization of a certain energy state, said polarized atoms diffusing through said constricting means into said second region of said envelope for storage therein in the nonequilibrium energy state, and circuit means disposed adjacent said second region for electromagnetic interaction with an ensemble of gaseous atoms within said second region in their nonequilibrium energy state for producing a net power flow of coherent emission of radiation from the ensemble in the second region to said circuit means at the atomic resonance frequency of the ensemble in the second region, whereby said circuit means operates independently of the optical pumping radiation applied in said first region to monitor atomic resonance of said ensemble of gaseous atoms in said second region.

10. The apparatus according to claim 9 wherein said gaseous atoms within said envelope means are $He^3$ atoms and the stimulated emission of radiation is obtained from the nuclei of the $He^3$ atoms in said second region, whereby an extremely narrow band and precise output signal is obtained the frequency of which is dependent upon the intensity of the polarizing magnetic field over the second region.

11. The apparatus according to claim 9 wherein said atoms within said envelope are hydrogen atoms and said envelope enclosing said first and second regions is coated with a nonrelaxing wall material, said electrical circuit means comprises a cavity resonator, and said ensemble of atoms in said second region is radiating from a hyperfine resonance transition.

12. The apparatus according to claim 11 wherein said first region of said envelope structure includes an uncoated wall portion with the electrical discharge being predominantly confined to said envelope region which is uncoated whereby said coating material does not deleteriously effect the pumping of the gaseous atoms.

13. The apparatus according to claim 9 wherein said constricting means is an elongated tube interconnecting said first and second regions, and including a second constricting means in said envelope structure for constricting the diffusion of atomic particles from said one region of said envelope to a third region of said envelope, said polarized atoms diffusing from said one region through said second constricting means into said third region of said envelope for storage therein in the nonequilibrium energy state, and said second and third regions being spaced apart in space such that the resonant frequency of the stimulated emission of the atomic particles stored in said second and third regions is determinate of the resonant conditions in the spaced second and third regions.

14. The apparatus according to claim 13 wherein said second and third regions are disposed on opposite sides of said first pumping region, and said radiating atoms radiate from a transition which is magnetic field dependent thereby yielding two atomic resonant signals determinative of the magnetic fields over said second and third regions, and including means for comparing the two resonant frequencies to obtain a measure of the magnetic field gradient between said second and third regions.

15. The apparatus according to claim 9 wherein means are provided for refrigerating said second region of space relative to said first pumping region whereby enhanced stimulation of radiation is obtained.

16. An optically pumped atomic diffusion maser apparatus for current control including, means forming an envelope structure, atomic gaseous material filling said envelope structure to diffusion pressures, means disposed in said envelope for confining diffusion of gaseous atoms from a first region of said envelope to a second region of said envelope, means for exciting an electrical discharge in a first one of said regions, means for optically pumping said first region to produce gaseous atoms in a nonequilibrium energy state for diffusion into said second region, electrical circuit means coupled to the assemblage of atoms in said second region for exciting stimulated emission of radiation therefrom and picking up the resonance signal therefrom, means forming an electrical circuit the current in which it is desired to regulate, means forming a current control device connected in circuit with the circuit to be regulated, said circuit to be regulated including a coil portion for generating a magnetic field permeating said second region of said envelope structure whereby the atomic radiation frequency is responsive to the magnetic field intensity produced by the current flowing through said circuit to be regulated, means forming a reference frequency determinative of the magnitude of the current to be regulated in said circuit, means for comparing the reference frequency with the frequency of the stimulated emission from said gaseous atoms to produce an error signal, and means for applying the error signal to said current control device for regulating the current in said circuit whereby an extremely stable and precise control of the current is obtained.

17. An optically pumped atomic diffusion gas maser apparatus for gyromagnetic resonance spectroscopy including, means forming an envelope means filling said envelope structure with an atomic gaseous medium to diffusion pressures, confining means for constricting the diffusion of gas within said envelope and subdividing said envelope structure into first, second and third regions, means for exciting said gaseous atoms to a nonequilibrium energy state in a first of said regions with said excited atoms diffusing into said second and third regions, circuit means coupled to a magnetic field dependent atomic resonance of said excited atoms in said second region for producing stimulated emission of radiation at the atomic resonance frequency, means for holding a sample of matter to be investigated within a magnetic field permeating said second and third regions and said sample of matter under investigation, means for applying the emission of radiation from said second region to said sample of matter under investigation to excite resonance thereof, means for detecting resonance of said sample of matter and for applying the resonance signal to said third region of said envelope to produce stimulated emission of radiation of said atoms in said third region and to amplify the resonance signals, means for sweeping the resonance condition of said sample of matter relative to the resonance conditions of said second and third regions, and means for displaying the resonance signal of said sample of matter under investigation as a function of the sweep of the resonance condition to obtain an extremely precise and stable resonance spectrum of the sample under investigation.

18. An atomic resonance apparatus for obtaining atomic resonance of gaseous atomic material including an envelope structure for containing a gaseous atomic medium therein at pressures wherein the predominant gas confining mechanism is one of successive gas to gas collisions, means for constricting diffusion of gaseous atoms from a first region of said envelope structure to a second region of said envelope structure, means for applying optical pumping radiation to said gaseous medium in the first one of said regions for producing certain nonequilibrium energy states of said gaseous atoms, means forming an electrical circuit having the magnetic fields thereof when energized coupled into said second region for electromagnetic interaction with an ensemble of nonequilibrium energy gaseous atoms that have diffused from said first region into said second region and providing means operating independently of the optical pumping radiation applied in said first region for monitoring atomic resonance of said ensemble of gaseous atoms in said second region, whereby said resonant ensemble of atoms in said second region is removed from the adverse effects of pumping products produced in said first region.

References Cited

UNITED STATES PATENTS

| | | | |
|---|---|---|---|
| 2,884,524 | 4/1928 | Dicke | 324—.5 |
| 2,994,836 | 8/1961 | Holloway | 324—.5 |
| 3,049,662 | 8/1962 | Abragam et al. | 324—.5 |
| 3,206,671 | 9/1965 | Colgrave et al. | 324—.5 |

FOREIGN PATENTS 670,586   9/1963   Canada.

OTHER REFERENCES

Carpenter: Physical Review, vol. 46, Oct. 1, 1934, pp. 607 to 610.

Colgrave et al.: Physical Review, vol. 132, No. 6, Dec. 15, 1963, pp. 2561 to 2563, and pp. 2565 to 2568, and p. 2572.

Shearer et al.: The Review of Scientific Instruments, vol. 34, No. 12, December 1963, pp. 1363 to 1366.

RUDOLPH V. ROLINEC, *Primary Examiner.*

MAYNARD R. WILBUR, WALTER L. CARLSON,
*Examiners.*

M. J. LYNCH, *Assistant Examiner.*